United States Patent [19]

DeYoung et al.

[11] Patent Number: 4,580,147

[45] Date of Patent: Apr. 1, 1986

[54] INK JET APPARATUS WITH IMPROVED RESERVOIR SYSTEM FOR HANDLING HOT MELT INK

[75] Inventors: Thomas W. DeYoung; Viacheslav B. Maltsev, both of Stormville, N.Y.

[73] Assignee: Exxon Research and Engineering Co., Florham Park, N.J.

[21] Appl. No.: 661,923

[22] Filed: Oct. 16, 1984

[51] Int. Cl.[4] .............................................. G01D 15/16

[52] U.S. Cl. ................................ 346/140 R; 137/341; 137/574; 219/421

[58] Field of Search .................... 340/140 PD, 140 JJ, 340/140 R, 75, 1.1; 400/126; 106/20, 30, 31; 137/334, 341, 5.74; 222/146.5; 219/421

[56] References Cited

U.S. PATENT DOCUMENTS 3,585,361 6/1971 Rosen et al. ................ 222/146.5 X 3,653,932 4/1972 Berry et al. ...................... 346/1.1 X 4,485,941 12/1984 Frates et al. .................... 222/146.5

FOREIGN PATENT DOCUMENTS 97823 1/1984 European Pat. Off. .

*Primary Examiner*—E. A. Goldberg

*Assistant Examiner*—Fred L. Kampe

[57] ABSTRACT

Ink jet apparatus for use with hot melt ink has an integrally connected ink jet head and reservoir system, the reservoir system having a sloping flow path between an inlet position and a sump from which ink is drawn to the head, the reservoir being housed in a housing of good heat conductivity material with a heater connected thereto, and further having one or more heat conducting elements positioned between the inlet position and the sump, which elements are constructed to act both as baffles and as heat conducting fins.

13 Claims, 2 Drawing Figures

INK JET APPARATUS WITH IMPROVED RESERVOIR SYSTEM FOR HANDLING HOT MELT INK

BACKGROUND OF THE INVENTION

This invention relates to ink jet apparatus having an ink jet head for ejecting droplets of ink, and more particularly, to such apparatus having a reservoir for supplying hot melt ink to the ink jet head.

The use in ink jet systems of hot melt ink, which ink is normally in a solid or frozen state but attains a liquid state or phase when its temperature is raised, has presented a number of advantages to ink jet apparatus. For a discussion of the characteristics of such ink and the use thereof in ink jet apparatus, reference is made to U.S. Pat. No. 4,390,369 and pending U.S. Applications Ser. No. 610,627, filed May 16, 1984; Ser. No. 565,124 filed Dec. 23, 1983, all assigned to the same Assignee as this invention and incorporated herein by reference.

While the use of hot melt ink has presented advantages as discussed in the above references, it also creates additional requirements for the design of the apparatus, including with respect to the reservoir system. The reservoir, which is part of the movable apparatus for devices such as ink jet printers, must be designed to maintain all of the ink in the reservoir at a substantially constant and uniform temperature so that the ink characteristics do not vary. Further, there is a need to reduce fluid flow lengths; to protect against tilting of the apparatus; and to maintain a substantially constant head of ink pressure regardless of movement of the reservoir. In order to meet these and other requirements, conventional reservoir designs as previously utilized are insufficient, and there has risen a need to a sump in the floor which provides a constant source of ink under even the most extreme tilting or transient motion conditions, the sump being located very close and to the ink jet head so as to optimize the fluid compliance seen at the manifold which feeds the ink jet array.

DETAILED DESCRIPTION OF PREFERRED EMBODIMENTS

Figure 1:
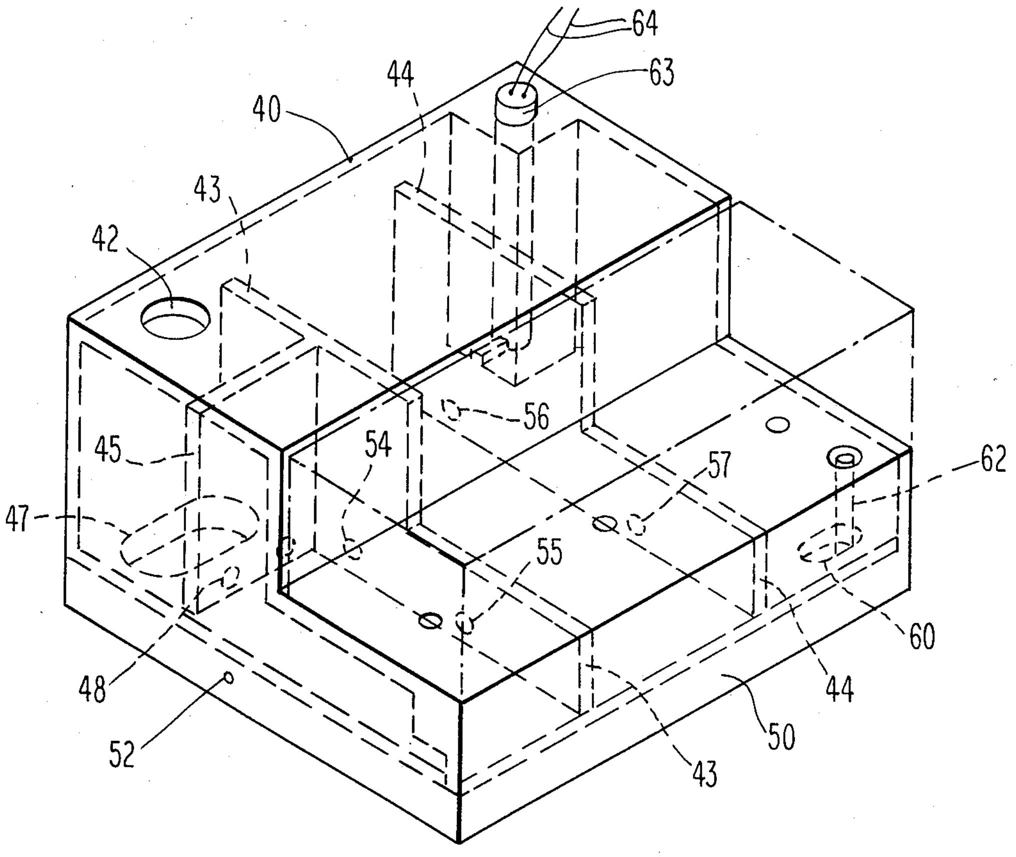
FIG. 1 is a diagrammatic perspective view of the reservoir system of this invention, further illustrating the position of the ink jet head in relation to the reservoir system.

Referring to FIG. 1, there is shown the reservoir system of this invention having a housing 40 which entirely contains the reservoir except for an inlet 42 where the ink pellets are introduced. Housing 40 is constructed of a highly efficient heat conductive material, such as aluminum as described in co-pending application Ser. No. 661,924, filed Oct. 16,1984 assigned to the assignee of this invention and which is incorporated herein by reference. The housing is preferably mounted vertically in the apparatus, and has a floor 50, illustrated also in FIG. 2, which has a small defined slope for aiding flow of the melted ink from the inlet area to the reservoir outlet area, as described further hereinbelow. Although the inlet is illustrated as being simply an opening 42, it is to be understood that various forms of pellet loading may be utilized in connection with the apparatus of this invention.

Figure 2:
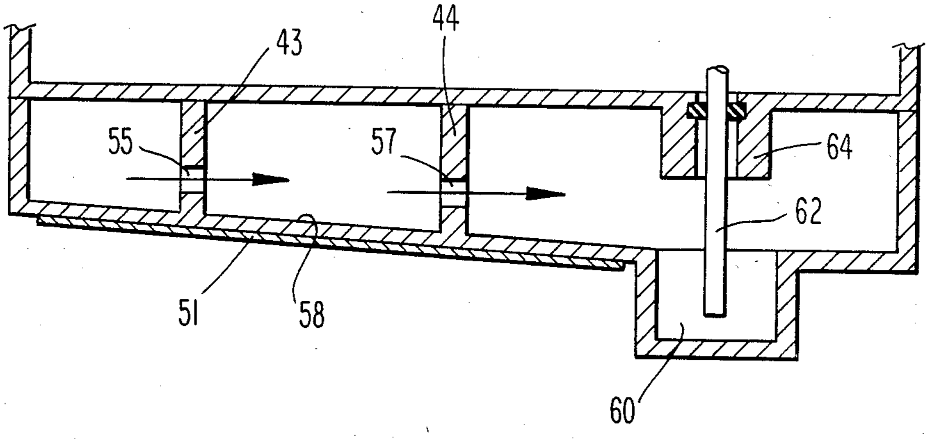
FIG. 2 is a diagrammatic front view of the reservoir system of FIG. 1.

Still referring to FIG. 1, the ink pellet is received in a compartment defined by a baffle portion 45, a portion of baffle 43, and the floor and cover of the housing. The floor of the ink receiving compartment is also suitably provided with a well 47 for holding the ink pellet. A heater 51 is provided under the floor surface and in thermal connection with the floor, so as to provide heat throughout the reservoir, including to the well 47. As seen in FIG. 2, heater 51 preferably provides uniform heat throughout the area of the floor 50. Although not illustrated, the heater may also wrap around other portions of the housing 40. A temperature sensor 52 is suitably positioned in the floor portion to monitor the temperature and provide feedback to a control (not shown) to maintain the heater temperature. An opening 48 is provided in baffle portion 45 to pass through the melted ink from the ink receiving compartment to the remainder of the reservoir system.

Two baffles 43, 44 are shown extending from the front to the back of the reservoir, and being integrally connected to the floor 50 along the length of the baffles, so as to provide both mechanical and thermal connection between the floor and the baffles. The baffles are made of a highly efficient heat conductive material, preferably aluminum. In the preferred embodiment, the housing and the baffles are constructed of the same heat conducting material. As used herein the phrase "thermal connection" means that the element is connected so that there is no significant impedance to heat transfer. In this sense the baffles are in thermal connection with the heater, through the floor 50.

As seen at the rear portion of the reservoir system, baffles 43, 44 do not extend up to the top roof, or cover portion of the housing 40. This permits bubbles which have developed in the ink at any point in the reservoir to pass along the upper back portion within the housing and exit through vent 42. As is also seen, vent 42 provides atmospheric pressure to the reservoir. Although two baffles are shown in the figures, it is to be understood that one baffle or more than two baffles may be utilized. The baffles need not be planar as indicated, but can be constructed with different contours. However, it is preferred that they be positioned to partition the reservoir into substantially equal volumetric portions, in order to optimize the effectiveness of the baffles in reducing sloshing when the reservoir is transported, and also to optimize heat conductivity to all of the ink within the reservoir.

As illustrated, each of the baffles has one or more openings or holes, baffle 43 being shown with openings 54, 55 and baffle 44 being illustrated with openings 56, 57. These openings provide passage for the ink, which flows by gravity feed down the sloped surface 58 of floor 50 through the baffle openings and toward the sump 60 which is positioned in the front right hand portion of the floor 50. The openings are restricted in size to maximize the baffle protection against sloshing, but are sized to permit at least a flow sufficient to accommodate the maximum rate of ink droplet ejection. As used herein, maximum flow rate of ink refers to the flow rate when all of the transducers of the ink jet apparatus are being operated at the maximum rate. Ink flow can also be facilitated through the reservoir by constructing the baffles so that they do not extend fully from wall to wall so as to form separate compartments. However, for heat conduction purposes, as well as for maintaining the most uniform pressure head, it is preferred that the baffles extend fully from front to back.

As seen in FIGS. 1 and 2, a sump 60 is provided at a low section of the floor, and is designed to maintain a source of ink regardless of movement or tilting of the apparatus. An inlet pipe 62 extends down into the sump, and provides passage of the ink up through the cover of the reservoir into the head mounting 65. The pipe 62 is preferably limited to about one inch in length, to optimize fluid matching with the print head manifold. A capillary fill is provided around the outside of the upper portion of the inlet pipe by annular structure 64, in order to minimize the temperature gradient of the ink which is contained in inlet pipe 62.

As illustrated in FIG. 1, the reservoir is configured so that the ink jet head is efficiently mounted with it in an integrated fashion. The head is shown only schematically, and it is understood that head contains the necessary elements for producing an array of ejected ink droplets as desired. Reference is made to co-pending U.S. application Ser. No. 604,128, filed April 26, 1984, which is incorporated by reference, and which illustrates in detail operative elements and features of an ink jet head.

Also illustrated is a level sensor 63 having outlet leads 64 which suitably connect to control circuitry on the print head, for providing an indication of a low ink level, which may be rectified by manual or automatic ink replenishment.

Although the apparatus of this invention has been described in the preferred forms, it is to be understood that other variations are within the scope of the invention as claimed. For example, the housing and baffles may be constructed of other good heat conducting metals or alloys, and the baffles may include additional fin elements for heat distribution. The openings need not be simple holes but may, or example, incorporate one-way valve elements to aid in maintaining ink in the sump area. The baffler and the reservoir as well as other details of the system may also take the form shown in copending application Ser. No. 661,925, filed Oct. 16, 1984 which is assigned to the assignee of this invention and incorporated herein by reference.

We claim:

1. Ink Jet apparatus having an ink jet head for ejecting ink droplets and a reservoir system for supplying hot melt ink to said ink jet head, said reservoir system comprising:

a housing made of a heat conductive material,
a heater in thermal connection with said housing,
an ink receiving compartment within said housing,
said housing having a sloped floor with said receiving compartment located at a relatively high level position of said floor,
a sump in said floor located at a relatively low level position of said floor,
at least one heat conducting baffle positioned within said housing between said receiving compartment and said sump, said at least one baffle being in thermal connection with said heater and having at least one ink communicating opening through which ink can pass.

2. The ink jet apparatus of claim 1, wherein said at least one baffle is made of aluminum.

3. The ink jet apparatus of claim 1, comprising two of said baffles.

4. The ink jet apparatus of claim 3, wherein each of said baffle openings is sized in accordance with the maximum flow rate of ink ejected from said ink jet head.

5. The ink jet apparatus of claim 1, further comprising an inlet pipe for carrying ink from said sump to said head, said inlet pipe being no longer than about one inch in length.

6. The ink jet apparatus of claim 5, comprising capillary fill means for drawing ink from said sump to substantially surround the outside of said inlet pipe.

7. The ink jet apparatus of claim 1, wherein said at least one baffle is mounted vertically within said housing and extends less than the full vertical inside dimension of said housing, thereby providing a bubble escape path for said reservoir system.

8. Ink jet apparatus having an ink jet head and a reservoir system for supplying hot melt ink to said ink jet head, said reservoir system comprising a housing made of an efficient heat conductive material and a heater in thermal connection with said housing, further comprising:

inlet means for introducing ink into said reservoir,
outlet means for carrying ink from said reservoir to said ink jet head, and
a plurality of heat conductive baffles interspaced between said inlet means and said outlet means, each of said baffles being made of an efficient heat conductive material and being in thermal connection with said heater so as to uniformly maintain the temperature of the ink within said reservoir system, each of said baffles having at least one opening for passing ink therethrough.

9. The ink jet apparatus of claim 8, wherein said ink jet head has means for ejecting ink droplets at a rate up to a predetermined maximum rate, and wherein said openings are sized to restrict ink flow through said baffles to a maximum rate of about said predetermined maximum rate.

10. The ink jet apparatus of claim 8, wherein said housing and said baffles are connected mechanically and thermally.

11. The ink jet apparatus of claim 10, wherein said housing and said baffles are made of aluminum.

12. The ink jet apparatus of claim 8, wherein said baffles are spaced so as to provide substantially equal compartments within said reservoir.

13. The ink jet apparatus of claim 12, wherein said heater is positioned adjacent to the floor surface of said housing, and each of said baffles is in contact with said floor surface, whereby each said baffle is maintained at about the same temperature.

* * * * *